United States Patent [19]
Behrmann et al.

[11] Patent Number: 6,006,988
[45] Date of Patent: Dec. 28, 1999

[54] NON-CASH MEDIA CARD AND PROCESS OF DISPENSING FROM AUTOMATED TELLER

[76] Inventors: Bry E. Behrmann, 217 Griswold, Phoenix, Ariz. 85021; Douglas S. Oberan, 4819 W. Royal Palm Rd., Glendale, Ariz. 85302; Stephen Lloyd Oberan, 5371 Fox Ct. S., Salem, Oreg. 97306

[21] Appl. No.: 08/893,171

[22] Filed: Jul. 15, 1997

[51] Int. Cl.⁶ ................................................ G06F 17/60
[52] U.S. Cl. .................... 235/379; 235/380; 235/381; 283/51
[58] Field of Search ................... 235/375, 379, 235/380, 381, 487; 902/13, 14; 283/51, 58, 59, 117

[56] References Cited

U.S. PATENT DOCUMENTS

| | | | |
|---|---|---|---|
| 4,385,285 | 5/1983 | Horst et al. | 235/379 |
| 4,877,946 | 10/1989 | Ando et al. | 235/380 |
| 4,891,502 | 1/1990 | Motoi et al. | 235/379 |
| 4,958,066 | 9/1990 | Hedgcoth | 235/487 |
| 4,968,873 | 11/1990 | Dethloff et al. | 235/380 |
| 5,092,445 | 3/1992 | Kozima | 194/206 |
| 5,243,174 | 9/1993 | Veeneman et al. | 235/381 |
| 5,308,120 | 5/1994 | Thompson | 283/51 |
| 5,408,417 | 4/1995 | Wilder | 235/381 |
| 5,440,108 | 8/1995 | Tran et al. | 235/381 |
| 5,450,938 | 9/1995 | Rademacher | 194/206 |
| 5,464,087 | 11/1995 | Bounds et al. | 194/200 |
| 5,477,037 | 12/1995 | Berger | 235/379 |
| 5,479,003 | 12/1995 | Yamada | 235/475 |
| 5,678,937 | 10/1997 | Smith | 235/379 |

*Primary Examiner*—Michael G Lee
*Assistant Examiner*—Daniel St. Cyr
*Attorney, Agent, or Firm*—Robert L. Shaver

[57] ABSTRACT

A non-cash media card which is dispensable through automated teller machines (ATM's) and a process for dispensing a non-cash media card from an automated teller machine, by which a non-cash media card is dispensed through the same mechanism as cash is dispensed. The non-cash media card can have separable portions, or be redeemable for goods or services, or may allow the bearer entry to an event or a location. One version of this type of card has a removable portion which is credit card size and can contain memory storage media. Information on the memory storage media can be later read, modified, and have its value reduced or augmented by subsequent uses.

25 Claims, 2 Drawing Sheets

NON-CASH MEDIA CARD AND PROCESS OF DISPENSING FROM AUTOMATED TELLER

BACKGROUND OF THE INVENTION

1. Field of the Invention

The present invention generally relates to non-cash media which is dispensed to a user, and more particularly to non-cash media which has value, and which is dispensed to a user through an automatic teller machine.

2. Description of Related Art

Automated teller machines (ATM's) were introduced in the mid 70's. These are machines which dispense cash to a user, typically after the user inserts a card with electronically encoded information, such as name and account number. The value of the cash dispensed is deducted from one of the user's bank accounts and shows up on his bank statement. Currently, ATM's can be found in the lobbies of banks, in drive-through installations, in malls, in gas stations, in grocery stores, in airports, and in any place where a customer may need to obtain cash.

It is common that ATM's also dispense certain non-cash documents, such as receipts, or information about a client's account balance. These documents are printed within the machine upon demand, and are typically produced and presented through a separate delivery slot than the cash which is presented to customers.

There are also specialized non-ATM machines presently available for use by consumers which dispenses such objects as stamps, or in other configurations, phone cards which entitle the user to a certain monetary value of phone transactions. These machines are configured to dispense a particular item, either stamps, phone cards, or other types of output. Because of their specialized function, it is impractical to offer to the customer a wide selection of cards dispensed from these machines, nor is cash dispensed from these machines, as an ATM does. What is needed is a card which may be dispensed from an ATM machine which has value to the user and which is selectable by the user through an ATM interface. Cards which may be dispensed and which have value could include admission tickets to events or locations, cards with encoded memories, such as phone cards or gas cards, cards with computer chips with encoded memory, collectable cards, cards with punch outs for goods or services, bar codes, cards redeemable for goods and services, or any other card like instrument which has value to the consumer. To be dispensable from ATM machines, the card would have dimensions and characteristics which correspond to the parameters of the ATM machine. From such an ATM dispensable card, one configuration could contain a credit card-size card which could be removable from the ATM dispensable card. The credit card size card could be a pass to an event, or contain encoded memory information, or be any of the previously listed embodiments of the card. If it contained encoded memory information, this card could be updated with new memory information, which could augment the value remaining on the card. Since the dispensed card could be the size of the currency dispensed by that particular ATM machine, and a smaller card would be removable from the currency-sized card, the dispensable card presents the opportunity for advertising, instructions, or other information to be presented to the user.

Accordingly, this invention provides a non-cash media card for use in ATM machines which is dispensable by the same apparatus which dispenses cash from ATM machines. It is a further object of the invention to provide a process for dispensing the non-cash media cards from an ATM machine through the same apparatus which dispenses cash.

Additional objects, advantages and novel features of the invention will be set forth in part in the description as follows, and in part will become apparent to those skilled in the art upon examination of the following, or may be learned by practice of the invention. The objects and advantages of the invention may be realized and attained by means of the instrumentalities and combinations particularly pointed out in the appended claims.

SUMMARY OF THE INVENTION

According to the present invention, the foregoing and other objects and advantages are obtained by a non-cash media card for use in an automatic teller machine (ATM). The ATM would be configured for use with a selected currency. Since the currency of different nations is of different dimensions, ATM machines are made which process currency of a number of dimensions. However, no ATM machine is made which can process and dispense a credit card-sized card –2"×3". The non-cash media card would be configured to correspond to the requirements of any of these ATM machines. The non-cash media card is a card which is dispensed by the ATM, and which has the same dimensional tolerances for the currency dispensed by the ATM. The non-cash media card has a value to the user or can be used by the user in exchange for goods and services.

The characteristics of the non-cash media card will be similar to the selected undamaged currency which the ATM processes In terms of the side edge characteristics, the flex and stiffness tolerances, the roughness tolerances, the thickness tolerances, the weight tolerances, the tear tolerances, the length and width tolerances, the porosity tolerances, and the contrast ratio opacity tolerance.

The non-cash media card could be a ticket allowing entry to an event or a location. It could also be a collectible card, such as a card for a sport figure or to commemorate an event. If the card involves stored memory, each subsequent transaction could reduce the remaining value chargeable on the card. Some uses of this card could be for telephone charges or for gas purchases, but obviously could be utilized for any purchase for which a card reader is available. For a non-cash media card as described above which contains a separable portion with information storage media, the value chargeable to the card can be augmented by a subsequent transaction in an appropriate machine or by the user at the ATM machine by making a phone call, by face-to-face transaction, or to other industry acceptable ways of augmenting value.

The invention is also a process for dispensing a non-cash media card from an ATM machine through the same channels as cash is dispensed.

The non-cash media card and the process of the invention, thus provides a card and a process for dispensing the card through an ATM machine. This provides a secure environment for dispensing a variety of value added cards which is not presently available. The secure environment has the unexpected benefit of reducing shrinkage due to losses from theft. This is also an unexpected use of an ATM machine. This also presents an opportunity for companies to advertise goods or services on the card, and allows a seller of a goods or services to sell a customer a non-cash media card which is redeemable at a later date with or without the use of a magnetic card reader or other value added storage devices.

Still other objects and advantages of the present invention will become readily apparent to those skilled in this art from the following detailed description wherein I have shown and described only the preferred embodiment of the invention, simply by way of illustration of the best mode contemplated by carrying out my invention. As will be realized, the invention is capable of modification in various obvious respects all without departing from the invention. Accordingly, the description is to be regarded as illustrative in nature, and not as restrictive.

DESCRIPTION OF THE PREFERRED EMBODIMENTS

Figure 1:
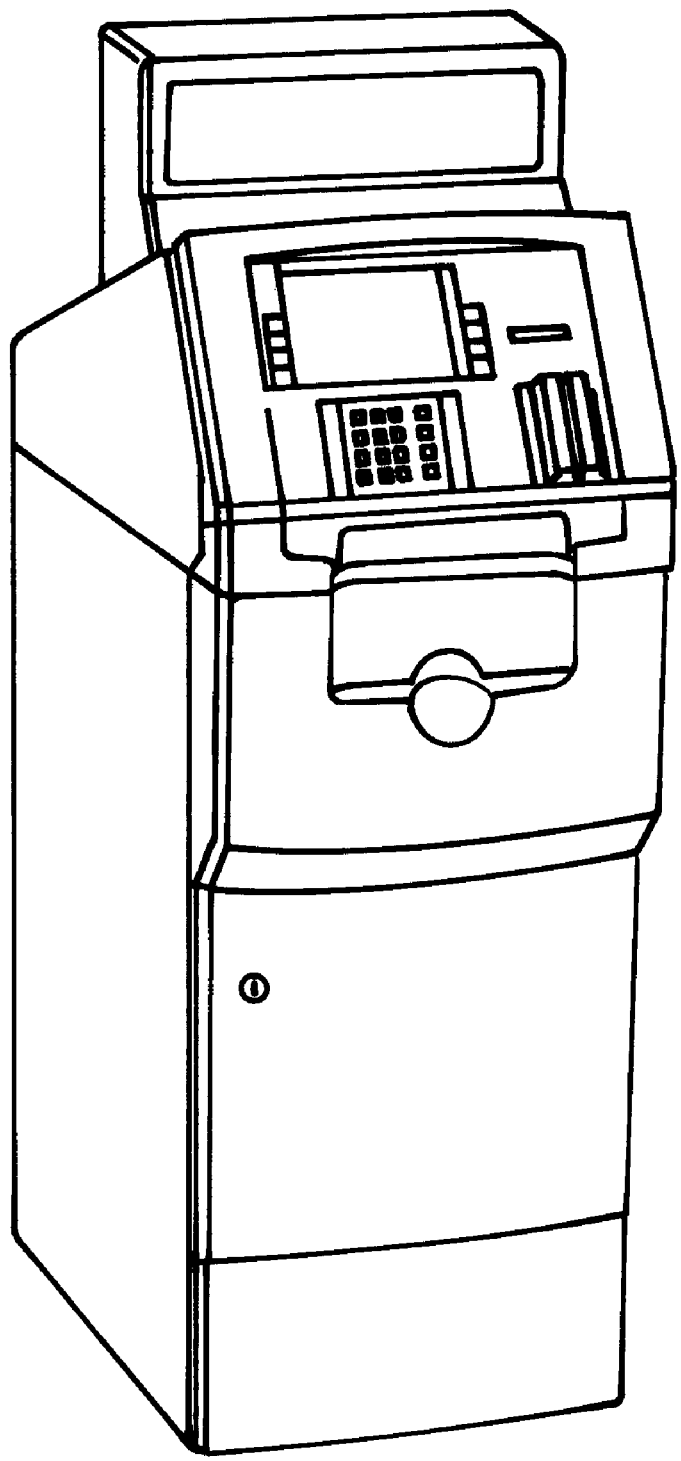
FIG. 1 is a perspective view of a prior art automated teller machine.
Figure 2:
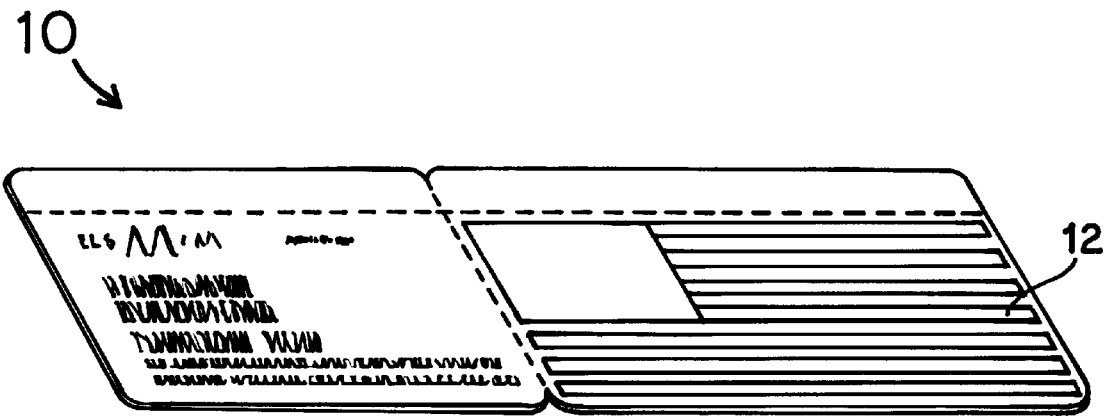
FIG. 2 is a perspective view of the non-cash media card of the invention with a detachable credit card size portion.
Figure 3:
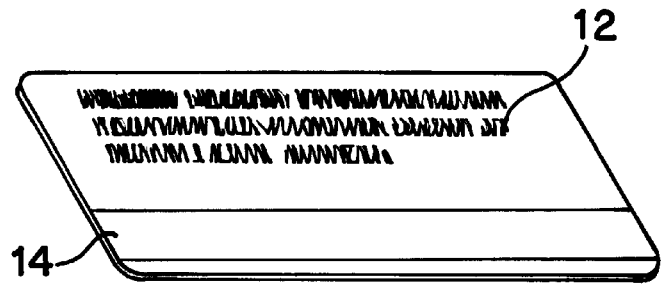
FIG. 3 is a perspective view of a detached credit card size portion from FIG. 2, which includes a memory strip.

The preferred embodiment of the invention is a non-cash media card which is dispensed from an automated teller machine (ATM). This card is preferably made from a plastic material, polyester, (does not leave a track mark), of which any number of formulations would be appropriate. The dimensions and tolerances of the card are such that it is compatible with the cash handling apparatus of an ATM machine. Specifically, the card is 8 to 30 mils thick. For an ATM machine which is configured to handle United States currency, the ATM dispensable card is 65 to 95 (2") millimeters in width. It is from 120 to 170 millimeters in length. The terms "machined direction" and "cross direction" come from the testing of a variety of plastic and other similar rigid/plastic materials for strength, flexibility, tear strength and durability. The phrase "machine direction" comes from the way the material is extruded in raw form by the original manufacturer. It is in essence the grain of the material as in the grain found in wood. Actual molecules of the material tend to line up in a pattern that create a "grain" or "machine direction" meaning the direction of the grain as found in the raw material as created by the extrusion process. The grain allows the act of tearing or cutting along the grain more easy than cutting or tearing across the grain. Its weight is 65 to 95 grams per square meters. Its bendsden roughness is from 200 to 1200 ml per minute. Its taber stiffness (in the cross direction) is 0.8 to 2.4 (machined direction) is from 1.2 to 4.0. Its bendsden velocity is 150 mils per minute. Its single tear (machined direction) is a minimum of 230 mN. Its single tear (cross direction) is a minimum of 270 mN. Its contrast ratio opacity (including inking) is a minimum of 79%.

While maintaining these physical characteristics, the non-cash media card can be configured to serve as an admission ticket to events or locations. It can also be configured to carry an image which makes the card collectible, such as an image of a sport figure. The card can be configured with punch-outs for goods or services, in which a region of the card is removed to indicate that goods have been received or a service has been performed. When all of the punch outs of the cards are utilized, the user would have to buy a new card with punch outs. The cards themselves may be also redeemable for goods or services, such as a car wash, a carpet cleaning, a hot air balloon ride, or any number of goods or services. The card could also have regions with encoded memory on which subsequent transactions would be recorded to diminish or augment the stored value on the card. The memory could be in the form of magnetic strip or strips, computer chips, bar codes, holograms, optical recognition or other means of storing data.

In another preferred embodiment of the invention, the non cash media card is configured to be within the dimensions as the currency being handled by an ATM machine, is of the same tolerances as noted above, and the possibility of having a removable portion which is the size of a conventional credit card. This removable portion can be configured as In the embodiment described above, to act as a pass to events, or as a collectible, and to carry stored information in a memory storage device. In both of these configurations, the non-cash media card can be printed to display promotional information in addition to serving the purpose for which the card was purchased.

In another preferred embodiment of the invention, the invention is a process for dispensing a non-cash media card from an ATM machine. The non-cash media card is a card as described above, which is selected by a user through the ATM interface, and dispensed from the ATM through the same apparatus as that which is used to dispense cash.

While there is shown and described the present preferred embodiment of the invention, it is to be distinctly understood that this invention is not limited thereto but may be variously embodied to practice within the scope of the following claims.

I claim:

1. A non-cash media card for use in an automated teller machine configured for use with a selected currency, comprising:

a non-cash media card which includes a credit card size separable portion and information and storage media with information encoded on the information storage media which the user utilizes for subsequent transactions, in) which said non-cash media card is configured for storage in a currency dispensing tray of an automated teller machine, and dispensation by said automated teller machine, and which has the same dimensional tolerances as the currency dispensed by the automated teller machine, and which has value to the user and is used by the user in exchange for goods and services.

2. The non-cash media card of claim 1 which further has the same side edge characteristics as the selected undamaged currency.

3. The non-cash media card of claim 1 which further has the same flex and stiffness tolerances as the selected undamaged currency.

4. The non-cash media card of claim 1 which further has the same roughness tolerances as the selected undamaged currency.

5. The non-cash media card of claim 1 which further has the same thickness tolerances as the selected undamaged currency.

6. The non-cash media card of claim 1 which further has the same weight tolerances as the selected undamaged currency.

7. The non-cash media card of claim 1 which further has the same tear tolerances as the selected undamaged currency.

8. The non-cash media card of claim 1 which further has the same length and width tolerances as the selected undamaged currency.

9. The non-cash media card of claim 1 which further has the same porosity tolerances as the selected undamaged currency.

10. The non-cash media card of claim 1 which further has the same contrast ratio opacity tolerances as the selected undamaged currency.

11. The non-cash media card of claim 1 in which said card comprises a ticket allowing entry to an event or location.

12. The non-cash media card of claim 1 in which said card is a collectible card.

13. The non-cash media card of claim 1 in which said card further comprises punch outs for subsequent purchase of goods or services.

14. The non-cash media card of claim 1 which further comprises information storage media with information encoded on the information media.

15. The non-cash media card of claim 1 in which said card can be utilized to pay for telephone charges for use of a telephone, with use of the telephone reducing the remaining value chargeable to the card.

16. The non-cash media card of claim 1 in which said card can be utilized to pay for gas purchases, with gas purchases reducing the remaining value chargeable to said card.

17. The non-cash media card of claim 1 in which said value chargeable to said card can be augmented by a subsequent transaction in an ATM machine.

18. A process for dispensing a non-cash media card from an automated teller machine which is configured for use with a selected currency, comprising the steps of:

loading said automated teller machine with one or more selections of a non-cash media card with a separable portion, in which said separable portion of said non-cash media card contains information storage media with information encoded on the information storage media which the user utilizes for subsequent transactions, with subsequent transactions reducing or augmenting the remaining value chargeable to the card, each of which are within the dimensional and physical tolerances as the currency dispensed by the automated teller machine, including side edge characteristics, flex and stiffness tolerances, roughness tolerances, same weight tolerances, tear tolerances, length and width tolerances, porosity tolerances, and contrast ratio opacity tolerances as selected on damage currency, and which has value to the user and is used by the user in exchange for goods and services;

selecting by a customer from a user interface of said automated teller machine a desired output in the form of cash or non-cash media card or cards; and dispensing to said customer either cash or non-cash media card from the same output mechanism.

19. The process of claim 18 in which said non-cash media further comprises a card with a separable portion.

20. The process of claim 18 in which said non-cash media card contains information storage media with information encoded on the information storage media which the user can utilize for subsequent transactions.

21. A non-cash media card for use in an automated teller machine configured for use with a selected currency, comprising:

a non-cash plastic media card which is dispensed by a currency dispensing tray of the automated teller machine, and which has the same dimensional tolerances, side edge characteristics, flex and stiffness tolerances, roughness tolerances, thickness tolerances, weight tolerances, tear tolerances, length and width tolerances, porosity tolerances, contrast ratio opacity tolerances, as the currency dispensed by the automated teller machine, and which has value to the user or is used by the user in exchange for goods and services, and comprises a card with a credit card sized separable portion and information storage media with information encoded on the information storage media which the user can utilize for subsequent transactions.

22. The non-cash media card of claim 21 in which said value chargeable to said card can be augmented by a subsequent transaction in an ATM machine.

23. A non-cash media card for use in an automated teller machine configured for use with a selected currency, comprising:

a non-cash media plastic card which is dispensed by a currency dispensing tray of the automated teller machine, and which is 65 to 90 mm in width, 120 to 170 mm in length, with a tabor stiffness in the cross direction of 0.8 to 2.4 and in the machined direction is 1.2 to 4.0, has a bendsden roughness of 200 to 1200 ml per minute, is 8 to 30 mils in thickness, has a bendsden velocity of 150 mils per minute, has a single tear in the machined direction of at least 230 mN, and in the cross direction has a single tear of at least 270 mN, has a contrast ratio opacity including inking is a minimum of 79%, and has a weight of 65 to 95 grams per square meter, and which has value to the user or is used by the user in exchange for goods and services, and comprises a card with a credit card sized separable portion and information storage media with information encoded on the information storage media which the user can utilize for subsequent transactions.

24. The non-cash media card of claim 23 in which said value chargeable to said card can be augmented by a subsequent transaction in an ATM machine.

25. A process for dispensing a non-cash media card from an automated teller machine which is configured for use with a selected currency, comprising:

loading said automated teller machine with one or more selections of a non-cash media plastic card, which is 65 to 90 mm in width, 120 to 170 mm in length, with a tabor stiffness in the cross direction of 0.8 to 2.4 and in the machined direction is 1.2 to 4.0, has a bendsden roughness of 200 to 1200 ml per minute, is 8 to 30 mils in thickness, has a bendsden velocity of 150 mils per minute, has a single tear in the machined direction of at least 230 mN, and in the cross direction has a single tear of at least 270 mN, has a contrast ratio opacity including inking is a minimum of 79%, and has a weight of 65 to 95 grams per square meter and which has value to the user or is used by the user in exchange for goods and services;

selecting by a customer from a user interface of said automated teller machine a desired output in the form of cash or non-cash media card or cards; and dispensing to said customer either cash or non-cash media card from currency trays in the ATM machine, through the same ATM output mechanism.

* * * * *